US010018647B2

(12) United States Patent
Ghai et al.

(10) Patent No.: US 10,018,647 B2
(45) Date of Patent: Jul. 10, 2018

(54) VELOCITY INTERFEROMETER FOR ANY REFLECTOR WITH VARIABLE SENSITIVITY RANGE AND TIME RESOLUTION

(71) Applicant: Defence Research & Development Organisation, New Delhi (IN)

(72) Inventors: Devinder Pal Ghai, New Delhi (IN); Het Ram Swami, New Delhi (IN); Anil Kumar Maini, New Delhi (IN)

(73) Assignee: Defence Research Development Organisation, New Delhi (IN)

( * ) Notice: Subject to any disclaimer, the term of this patent is extended or adjusted under 35 U.S.C. 154(b) by 393 days.

(21) Appl. No.: 14/715,296

(22) Filed: May 18, 2015

(65) Prior Publication Data
US 2015/0331004 A1     Nov. 19, 2015

(30) Foreign Application Priority Data
May 16, 2014   (IN) ........................... 1305/DEL/2014

(51) Int. Cl.
*G01P 3/36*     (2006.01)
*G01S 17/58*    (2006.01)

(52) U.S. Cl.
CPC ............... *G01P 3/36* (2013.01); *G01S 17/58* (2013.01)

(58) Field of Classification Search
None
See application file for complete search history.

(56) References Cited

U.S. PATENT DOCUMENTS 4,666,296 A * 5/1987 Bailly-Salins ............ G01P 3/36
356/28.5
5,245,473 A * 9/1993 Stanton .................... G01P 3/366
356/450

(Continued)

FOREIGN PATENT DOCUMENTS

CN    1725032 A  *  1/2006
CN  102760568 A  * 10/2012

OTHER PUBLICATIONS

Ballard et al.; Optical FM System for Measuring Mechanical Shock; Aug. 1969; Journal of Research of the National Bureau of Standards C. Engineering and Instrumentation; vol. 73C, Nos. 3 & 4. (Year: 1969).*

(Continued)

*Primary Examiner* — Daniel J Colilla
(74) *Attorney, Agent, or Firm* — DeLizio Law, PLLC

(57) ABSTRACT

The present disclosure relates to a velocity interferometer. The interferometer described herein, comprises of two optical cells, one partially containing a liquid. The light entering the interferometer is amplitude split and made to propagate through the two cells in such a way that the apparent path lengths of the beams are equal, thereby fulfilling the condition necessary for obtaining single wide fringe in the interference pattern of the two beams. However, due to difference in the physical path traversed by the two beams, a finite delay time exists between them. The two beams, after reflection from end-mirrors or cube corner prisms in the two cells are recombined to form interference fringe patterns on active areas of multiple detectors. Doppler shifted light resulting from reflection of light from a moving projectile generate fringe shifts on the detector planes thereby producing voltage signals proportional to instantaneous velocity of fast moving projectile. The voltage signals are recorded with multi-channel digital oscilloscope and processed in a pro- (Continued)

cessor/controller of a computing unit to obtain velocity time history of the projectile. Controlled motion of the cube corner reflectors placed at the ends of two cells using stepper motors and piezoelectric actuators ensures that the time delay between the interfering beams is controlled accurately thereby changing the sensitivity range and time resolution of the velocity measurements.

6 Claims, 6 Drawing Sheets

(56) References Cited

U.S. PATENT DOCUMENTS

2010/0329667 A1* 12/2010 Mikami ............... H04L 27/223 398/9
2011/0261437 A1* 10/2011 Chen .................... H04B 10/677 359/325

OTHER PUBLICATIONS

Chen et al.; Research of Doppler velocity interferometer system of laser-drive shock wave; Proceedings of SPIE; vol. 5638., pp. 210-215; https://www.SPIEDigitalLibrary.org/conference-proceedings-of-spie; 2005. (Year: 2005).*

* cited by examiner

VELOCITY INTERFEROMETER FOR ANY REFLECTOR WITH VARIABLE SENSITIVITY RANGE AND TIME RESOLUTION

RELATED APPLICATIONS

This application claims the priority benefit of Indian Patent Application No. 1305/DEL/2014 filed on May 16, 2014.

FIELD

The present disclosure relates to the field of interferometer. Particularly, the present disclosure deals with a velocity interferometer system for any reflector (VISAR).

BACKGROUND

Recording velocity time history of highspeed projectiles created by shockwaves, high energy plasmas and other rapid-acceleration devices is a major challenge for explosives and shock dynamic research labs, all over the world. The velocity of such fast moving projectiles ranges typically from 1-100 km/sec and is associated with large acceleration and retardation. The total time for recording velocity time history of such rapid moving surfaces is no more than a few micro seconds putting major constraints on the response time of measurement systems. Important optical techniques for measuring velocity under such extreme conditions, often encountered in dynamic compression research, include active shock breakout technique, inclined mirror measurement method and laser based interferometry. In active shock breakout, changes in the reflected light intensity generates signal for arrival of a mechanical wave whereas the inclined mirror measurement approach is based on the changes in reflected light direction for information of velocity of a fast moving surface. Both these techniques, however, provide only an average velocity of the projectile and offer limited accuracy. Laser based interferometry is the most versatile velocity measurement technique which is based on the measurement of changes in the optical phase of light reflected from the moving surface.

Interferometric techniques, besides being non-intrusive in nature, provide complete velocity time history, thereby enabling measurement of large acceleration/retardation along the projectile flight. Moreover, interferometry techniques are far more accurate and offer better time resolution. Displacement and velocity interferometers are two prior art systems often used for the study of shock dynamic phenomena. In a displacement interferometer, the light that undergoes a Doppler shift due to its reflection from a moving object/projectile is interfered with a reference light (without Doppler shift) to measure the displacement of the object as a function of time. The received data is then differentiated with respect to time for obtaining velocity time history of the projectile. One major difficulty with this approach is that the Doppler shift obtained is, in general, very large, which imposes serious constraints on the bandwidth of detectors and measuring equipment. Moreover, displacement interferometers put stringent requirements on temporal and spatial coherence of the laser source and surface finish of the moving surface. Further, the movement of the surface should essentially be along the optical axis of the collection optics to obtain proper contrast in the fringe pattern.

In a velocity interferometer, the Doppler shifted light due to reflection from a moving target is made to interfere with a delayed version of it. As a result, the velocity interferometers do not require high degree of coherence of the laser source. Moreover, the quality of the fringe pattern and hence S/N ratio of system is not affected by the nature of the target surface, smooth or diffused, and by any tilt generated during movement of the target. Hence, the system is often referred to as velocity interferometer system for any reflector (VISAR). Today, VISAR is one of the most prominent diagnostic tools for velocity measurements of short duration, high speed motions generated in dynamic compression phenomena. Since its invention in 1972, VISAR has undergone many up-gradations and modifications to its original configuration. Push-pull form of VISAR is the most widely used and preferred choice among all available VISAR configurations. It provides better signal strength, higher rejection of unwanted self-light of the projectile with minimum constraints on coherence of the optical source and surface finish of the target. The push pull form of VISAR is described here, in brief, for the sake of completeness.

In a push-pull VISAR, light from a laser source is relayed to the target using discrete optical components or a fiber cable. The use of fiber cable reduces the alignment complexities and offers large stand-off distance. A VISAR probe connected to the other end of the fiber is used to focus the laser light onto the target. The light reflected off the target is received by the same probe and is relayed back using another optical fiber. The light received at the output of this fiber is collimated to form input to a push-pull VISAR. FIG. 1 depicts schematic of a push pull VISAR. The input beam is amplitude split using a beam splitter and resulting beams are made to traverse two different paths (legs) of the interferometer. A time delay between the two beams is introduced by placing a glass bar/etalon in one of the two legs of the interferometer. The light beams reflected from the end mirrors in the two legs are recombined using the same beam splitter. Difference in the travel time of the light beams in the two legs results in the formation of interference fringe pattern. When the light entering the interferometer is Doppler shifted because of projectile motion, it results in fringe shift proportional to the instantaneous velocity of the projectile. The changes in the fringe shift with time form the basis for recording velocity time history of the moving surface. The instantaneous velocity of the moving surface is given by the Eq. 1.

$$U(t) = kF(t) = \frac{\lambda}{2\tau}F(t) \tag{1}$$

Where $k=\lambda/2\tau$ is the velocity change that would result in shift of one fringe in the VISAR. This value, often referred to as velocity per fringe (VPF) constant and denoted by symbol k is inversely related to the delay time $\tau$ and hence to the length of the delay bar h i.e.

$$\tau = \frac{2h}{C_0}\left(n - \frac{1}{n}\right) \tag{2}$$

where h is the length of delay bar and $c_0$ is the velocity of light in free space. The velocity of the projectile at any instance is obtained from the product of VPF constant and fringe count F(t). Use of polarizing optics in the interferometer generates quadrature signals that allow measurement of fringe count with an accuracy of about ±2% of one fringe, thereby enabling very precise and accurate velocity measurements. Besides measurement accuracy, the quadrature technique helps in differentiating between acceleration and retardation encountered along the path of the projectile. Special feature of a push pull VISAR is that quadrature signals received on two sides (transmitted and reflected beam) of the beam splitter are 180 degree out of phase. Subtraction of corresponding quadrature voltage signals at output of detectors on either side of beam splitter helps in increasing the signal strength by nearly two fold, rejection of unwanted self-light of the projectile and simplification in processing of velocity measurement data.

Most of the VISAR systems employ a fixed length of etalon/delay bar. Due to fixed length of the etalon, the velocity-per-fringe constant and hence the sensitivity range of velocity measurements is fixed. In order to change sensitivity and time resolution of velocity measurements, which is a general requirement in the dynamic compression research, the etalons need to be added to or subtracted from the existing system. A VISAR may use multiple etalons with provision of addition and subtraction of etalons. The use of multiple etalons, however, demands additional hardware, increased cost and alignment complexities.

The limitations and disadvantages of conventional and traditional system are apparent to the person skilled in the art, including for example, a) the limitation of fixed sensitivity range and time resolution of velocity measurements and b) Requirement of additional hardware and alignment complexities. Hence, there exists a strong need to provide an effective and versatile velocity interferometer for any reflector, wherein length of the etalon can be changed in a continuous manner to change the sensitivity and time resolution of the velocity measurements, effectively without additional hardware and alignment complexities.

OBJECT OF THE DISCLOSURE

Primary object is to provide an effective velocity interferometer to overcome the limitations and drawbacks of the existing systems used for measurement of velocities of high speed projectiles resulting from high amplitude shock waves, plasmas and other rapidly moving devices.

Yet another object is to provide a velocity interferometer which facilitates change in sensitivity and time resolution of velocity measurements effectively.

Further object is to provide a velocity interferometer, wherein length of etalon/delay bar can be altered in a continuous manner so as to change the sensitivity range and time resolution of the velocity measurements.

Another object of the present invention is to ensure that the system is versatile, cost effective and less complex in its design and implementation.

SUMMARY OF THE DISCLOSURE

Accordingly, the present disclosure provides an optical cell, comprising: a housing; a frame comprising a pair of guide rails extending in a longitudinal direction; a base plate disposed on the frame and adapted to move on the guide rails in the longitudinal direction; a rotary shaft passing through the base plate for enabling linear movement of the base plate; a first auxiliary adjustment unit comprising a fixed member attached to the base plate and a movable member adapted to move with respect to the fixed member in the longitudinal direction independent of the movement of the base plate; a vertical plate having a slot to hold optical reflective component; and a second auxiliary adjustment unit comprising a horizontal structure and a vertical structure for supporting the vertical plate and tilting the vertical plate along the horizontal and vertical direction with respect to the static support structure independent of the movement of first auxiliary adjustment unit.

According to one aspect, wherein the front wall of the housing is provided with a window for allowing passage for optical beam.

According to another aspect, wherein the housing is partially filled with liquid such that only the optical reflective component is immersed inside the liquid.

According to yet another aspect, further comprising at least one piezoelectric actuator coupled to the auxiliary adjustment unit for enabling linear movement of the movable member along the longitudinal direction.

According to further aspect, further comprising at least one piezoelectric actuator coupled to the support structure for enabling tilt of the vertical plate in the horizontal direction.

According to furthermore aspect, further comprising at least one piezoelectric actuator coupled to the support structure for enabling tilt of the vertical plate in the vertical direction.

According to another aspect, wherein the rotary shaft is coupled to the stepper motor for enabling linear movement of the optical reflective component.

According to yet another aspect, wherein the frame is fitted upside down at the top surface of the housing.

The present disclosure also provides a velocity interferometer system, a first optical cell including a first optical reflective component; a second optical cell including a second optical reflective component; a beam splitter configured to amplitude split incident light beam, direct the split light beam into said first and second optical cells via a first and second light path respectively, and recombine the reflected beams; at least one wave plate located between beam splitter and one of the optical cells to facilitate generation of two fringe patterns having fringe shift of a quarter wave; at least one polarized beam splitter to separate out two fringe patterns having fringe shift of a quarter wave; at least one pair of detectors for detecting the movement of interference fringes and recording phase quadrature signals; wherein, one of the optical cells is partially filled with liquid such that the optical path length of the first and the second light traversing path is same, but the physical length of these paths are different; wherein, said first and second optical cell are configured for enabling linear movement and/or tilting of their respective optical reflective components.

The following paragraphs are provided in order to describe the working of the inventive subject matter and nothing in this section should be taken as a limitation. The details of one or more embodiments of the subject matter described in this specification are set forth in the accompanying drawings and the description given below.

BRIEF DESCRIPTION OF DRAWINGS

In order that the inventive subject matter may be readily understood and put into practical effect, reference will now be made to exemplary embodiments as illustrated with reference to the accompanying drawings, where like reference numerals refer to identical or functionally similar elements throughout the separate views. The figures together with a detailed description below, are incorporated in and form part of the specification, and serve to further illustrate the embodiments and explain various principles and advantages, in accordance with the present disclosure, where.

Figure 1:
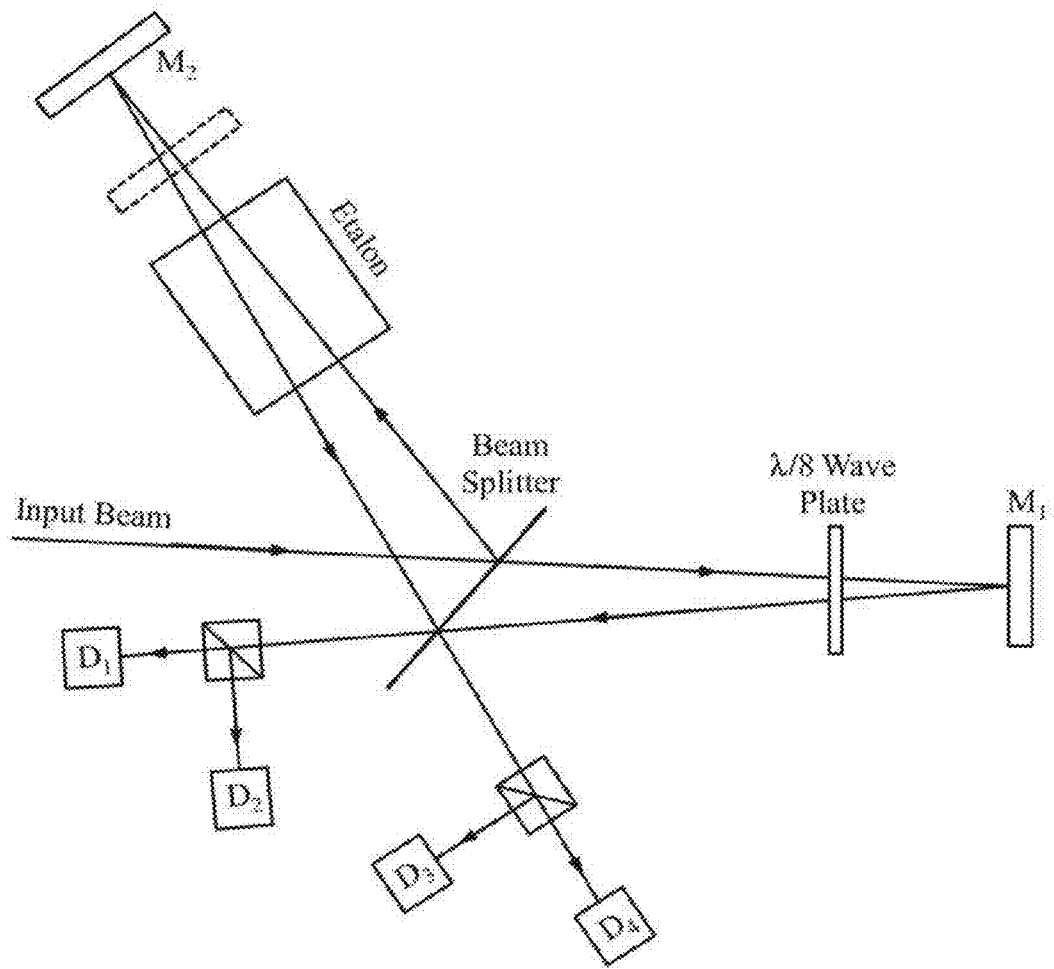
FIG. 1 illustrates the schematic assembly of conventional push pull VISAR.

Skilled artisans will appreciate that elements in the drawings are illustrated for simplicity and have not necessarily been drawn to scale. For example, the dimensions of some of the elements in the drawings may be exaggerated relative to other elements to improve understanding of embodiments of the present disclosure.

DETAILED DESCRIPTION OF EMBODIMENT(S)

The terms "comprises", "comprising", or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by "comprises . . . a" does not, without more constraints, preclude the existence of other elements or additional elements in the system or apparatus.

Overview

Accordingly, the present disclosure relates to a velocity interferometer. The interferometer described herein, comprises of two optical cells, one partially containing a liquid. The light entering the interferometer is amplitude split and made to propagate through the two cells in such a way that the optical path lengths of the beams are equal, thereby fulfilling the condition necessary for obtaining single wide fringe in the interference pattern of the two beams. However, due to difference in the physical path traversed by the two beams, a finite delay time exists between them. The two beams, after reflection from end-mirrors or cube corner prisms in the two cells are recombined to form interference fringe patterns on active areas of multiple detectors. Doppler shifted light resulting from reflection of light from a moving projectile generate fringe shifts on the detector planes thereby producing voltage signals proportional to instantaneous velocity of fast moving projectile. The voltage signals are recorded with multi-channel digital oscilloscope and processed in a processor/controller of a computing unit to obtain velocity time history of the projectile. Controlled motion of the cube corner reflectors placed at the ends of two cells using stepper motors and piezoelectric actuators ensures that the time delay between the interfering beams is controlled accurately thereby changing the sensitivity range and time resolution of the velocity measurements.

Figure 2:
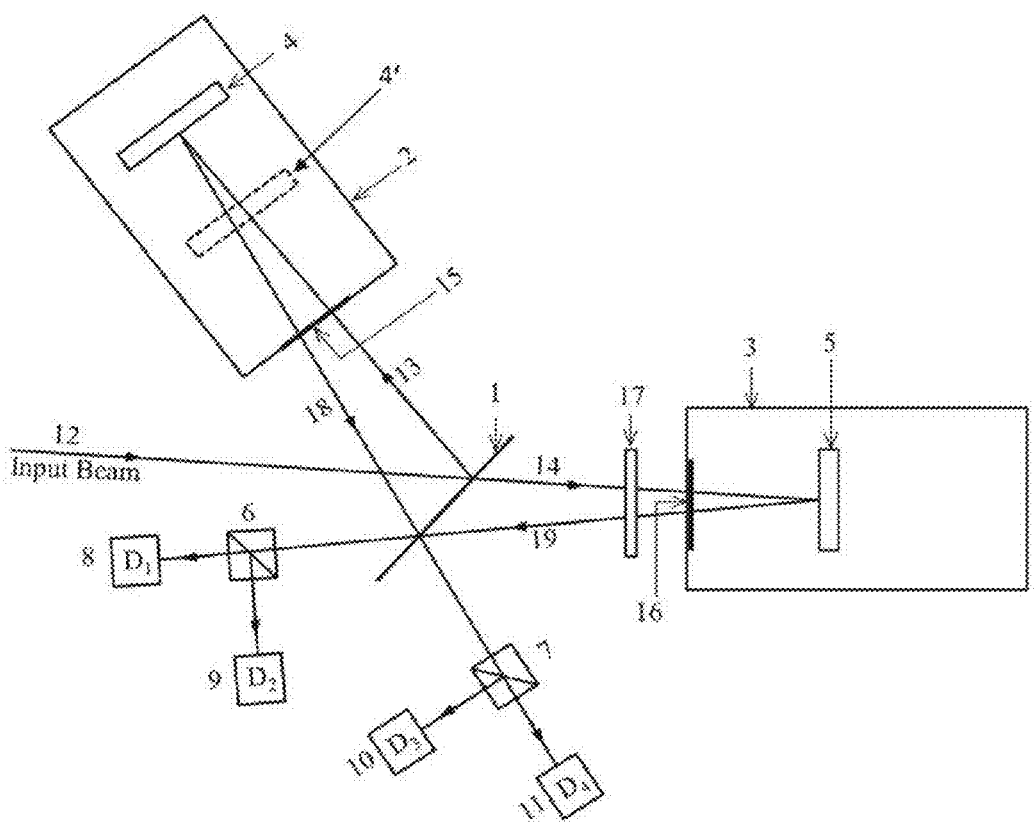
FIG. 2 illustrates a velocity interferometer in accordance with an embodiment of the present disclosure.

FIG. 2 depicts Velocity Interferometer for any reflector with variable sensitivity range and time resolution of velocity measurement in one embodiment, described herein, primarily comprises an un-polarized plate type beam splitter (1), two optical cells (2 & 3), optical reflective components (4 & 5), polarized beam splitters (6 & 7), and high speed optical detectors (8-11). A pair of optical detectors (8 & 9) is coupled to the polarized beam splitter (6). Similarly, second pair of detectors (10 & 11) are coupled to the polarized beam splitter (7). Optical reflective components may be selected from the group comprising a mirror, flat mirror, cube corner prism . . . etc. Light beam/input beam (12) obtained after reflection from a moving target forms input to the interferometer. The light beam is incident on the beam splitter/un-polarized beam splitter. Un-polarized beam splitter (1) divides the incident beam into two equally intense beams (13 & 14) which enters the optical cells (2 & 3) through optical window (15 & 16), respectively. The beam splitter (1) is located at equidistant from first and second optical cells. The two divided intense beams which are directed to said first and second optical cells are traversed via first and second path respectively. Optical window is provided in the front wall of the optical cell to allow passage of light beam. Any one of the optical cell can be filled with liquid. Preferably, not restricted to, the liquid may be water. Accordingly, for sake of ease, cell (2) is filled with a liquid, preferably water and cell (3) contains air. After reflection from the optical reflective components, for example, flat mirrors (4 & 5), the beams are recombined by the same beam splitter (1). Due to refractive index of liquid (water) being higher than that of air, the apparent position of flat mirror (4) in cell (2) is closer (4') to the beam splitter than its actual position. The position of flat mirror (5) in cell (3) is adjusted in such a way that its distance from the beam splitter (1) is same as that of the apparent position (4') of flat mirror (4), thereby fulfilling the criterion of high contrast fringe pattern. By properly matching the two distances, it is possible to obtain a single wide fringe, often referred to as Bull's eye, at the center of the fringe pattern. A $\lambda/8$ wave-plate (17) is placed in front of the cell (3) to introduce a path length difference of quarter wave ($\lambda/4$) or a phase difference of 90° between s and p polarization components, as the light beam traverses twice through the wave-plate. Thus, half of the light beam (18) reflected from and half of the light beam (19) transmitted through the beam splitter (1) would form two set of fringes which are shifted by path length of a quarter wave or differ in phase by 90° with respect to each other. The two sets of fringes are separated using polarized beam splitter (6) and made to incident on detectors (8 & 9), respectively. When the light entering the interferometer is Doppler shifted, the two detectors (8 & 9) generate voltage signals which are in phase quadrature. Similarity, half of the light beam (18) transmitted through and half of the light beam (19) reflected from beam splitter (1) generate another two sets of fringes which are 90° out of phase (Path length shift of a quarter wave). Polarized beam splitters (7) and detectors (10 & 11) are used to generate another set of phase quadrature voltage signals. The quadrature signal recorded by first pair of detectors (8 & 9) are 180° out of phase with respect to the quadrature signal recorded by second pair of detectors (10 & 11). All these voltage signals are recorded using high speed multi-channel digital oscilloscope and processed by a general purpose processor/a general purpose computer/a computing device to obtain velocity time history of the projectile motion. The computing device may represent an integrated multi-processor, in which elements of the present disclosure may be implemented. Computing device may comprise one or more physical machines/circuitry/means/modules which are communicatively connected to the interferometer. The computing device may include a system bus for communicating information, memory and one or more processors coupled to bus for processing information. The memory may also comprise a mass storage with one or more magnetic disk or tape drives or optical disk drives, for storing data and instructions for use by one or more processors.

Figure 3:
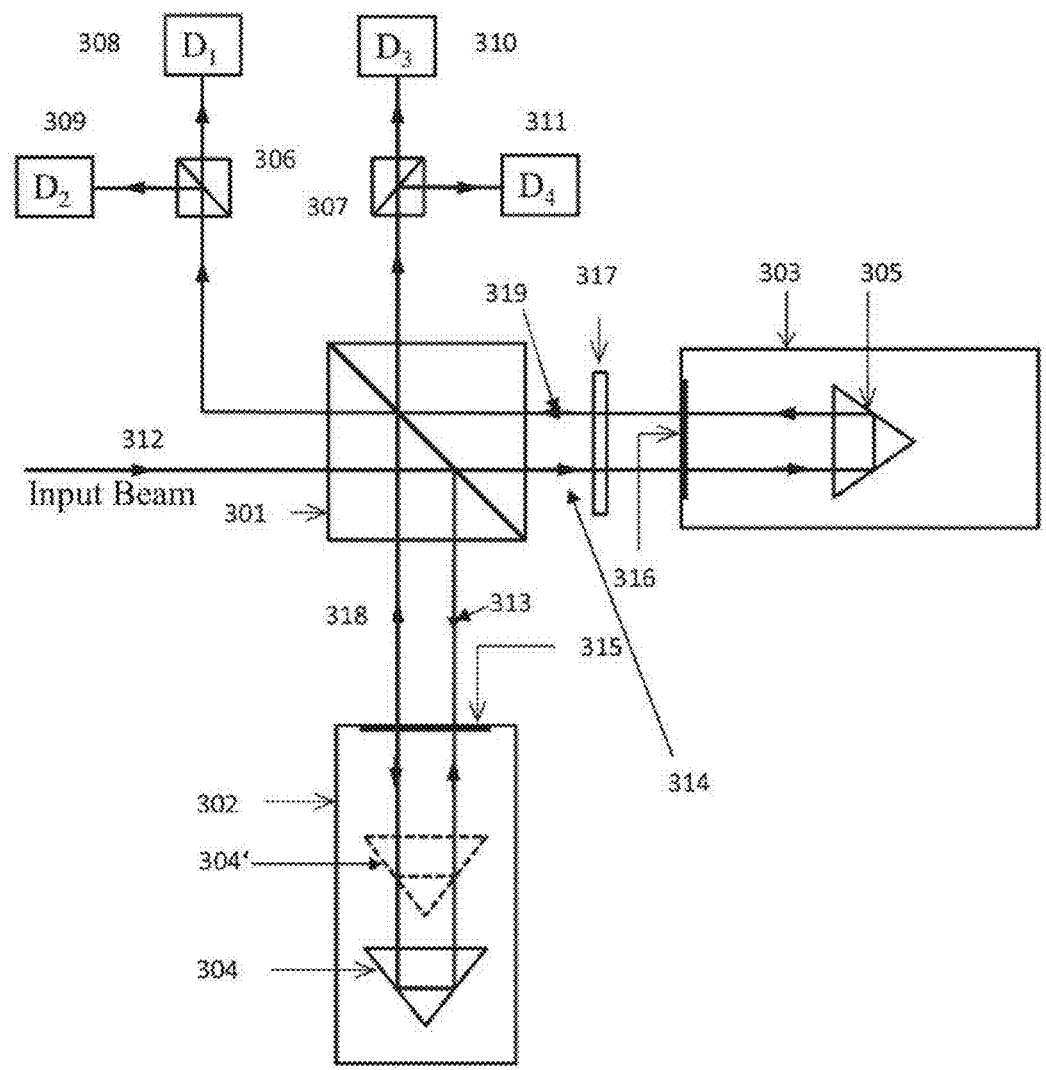
FIG. 3 illustrates a velocity interferometer in accordance with another embodiment of the present disclosure.

FIG. 3 depicts another embodiment of velocity interferometer for any reflector with variable sensitivity range and time resolution of velocity measurements. In this configuration, the plate type beam splitter (1) (as shown in FIG. 2) is replaced with a cube beam splitter (301) and the flat mirrors (4 & 5) (as shown in FIG. 2) are replaced by two cube corner prisms (304, 305). Rest of the hardware and the operational characteristic of all component of VISAR mentioned in the preferred embodiment remains the same.

In order to change the sensitivity of the velocity measurements, the length of the etalon is required to be changed. In one embodiment, this is achieved by changing the length of the liquid (water) column by moving the flat mirror 4/cube corner prism (304) in cell (2/302) forward or backward, as per the requirement. Accordingly, the position of the flat mirror (5)/cube corner prism (305) in cell (3/303) is also changed to ensure that the apparent path length of the beam propagating in the cell (2/302) and actual path length propagating in the cell (3/303) are exactly same. Both the flat mirrors (4 & 5)/cube corner prisms (304 & 305) are mounted on linear translation stages (402) having traverse range of 300 mm. Liner translation stage is hereafter referred as a frame (402).

Figure 4:
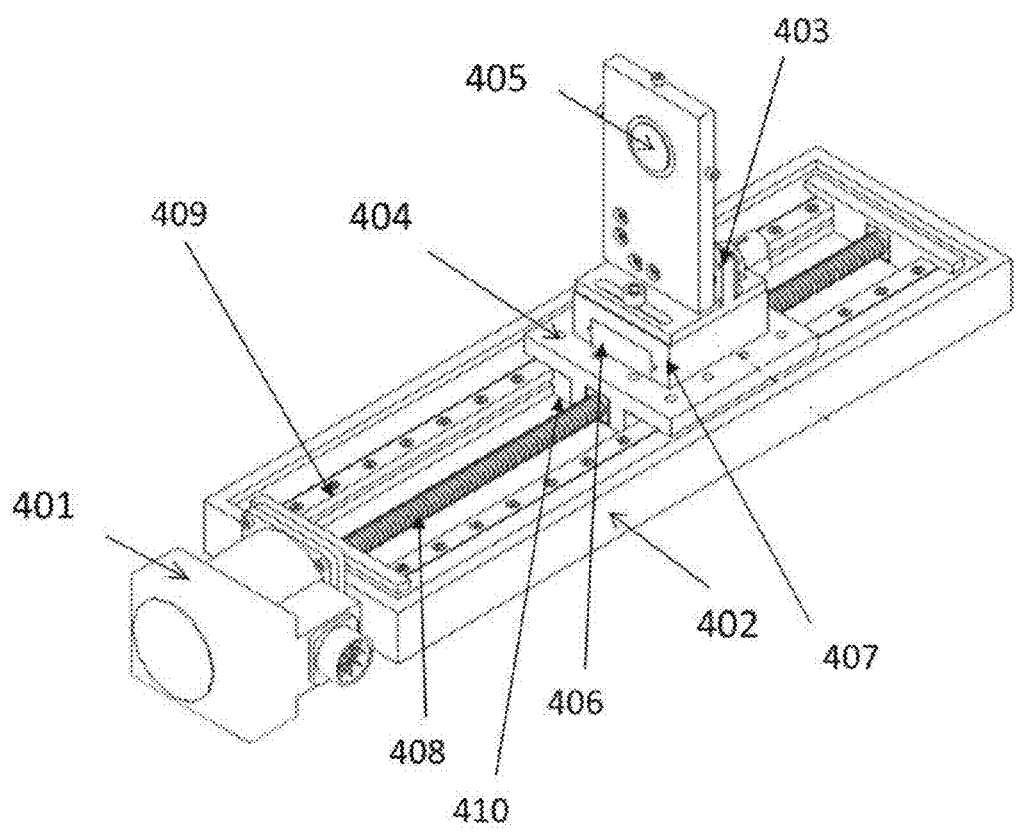
FIG. 4 illustrates an arrangement for linear and tilting movements of the reflective elements in the two optical cells in accordance with an embodiment of the present disclosure.

FIG. 4 illustrates an arrangement for linear and tilt movements of the reflective elements in the two optical cells. A frame (402) comprising a pair of guide rails (409) extending in a longitudinal direction; a base plate (404) disposed on the frame (402) and adapted to move on the guiderails in the longitudinal direction; a rotary shaft (408) passing through the base plate (404) for enabling linear movement of the base plate (404). The rotary shaft (408) is supported by the frame (402), wherein one end of the rotary shaft is coupled to the stepper motor (401). The rotary shaft is threadedly connected to the base plate, so as to move the base plate in a linear direction. The base plate (404) comprises a projection (410) which is accommodated in the guide rails to slide the base plate in a linear direction when the stepper motor rotates the shaft. Precisely, the frame is used for the movement of a flat mirror 4/cube corner prism (304) in the cell (2/302) and movement of a flat mirror 5/cube corner prism 305 in the cell (3/303). The rotary shaft (408) is coupled to a stepper motor 401 for accurate movement of the flat mirror/cube corner prism in the cell. The movable base plate (404), which holds the optical reflective component (405) and adjustment units (406/407 & 403), moves forward or backward depending on whether the stepper motor rotates clockwise or anti clockwise.

Figure 5:
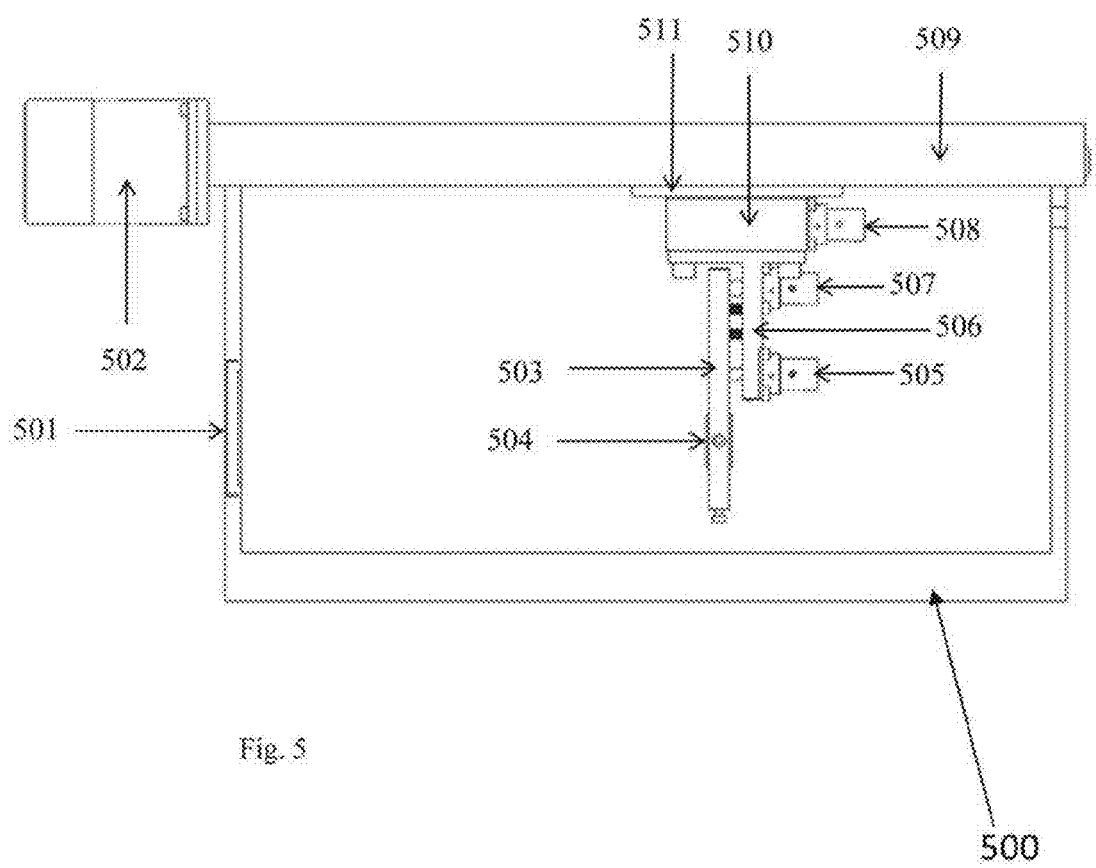
FIG. 5 illustrates a complete arrangement of an optical cell of a velocity interferometer in accordance with an embodiment of the present disclosure.

FIG. 5 shows optical cell (2/304), used in one embodiment. The optical cell comprises a housing (500), a frame (509), a base plate (511) disposed on the frame, a first auxiliary adjustment unit (510), a vertical plate (503) having a slot (504) to hold optical reflective component; and a second auxiliary adjustment unit (506). The frame along with the base plate, said first and second adjustment units and the vertical unit is fitted upside down at the top surface of the housing. The housing is partially filled with liquid such that only the optical reflective component is immersed inside the liquid. Precisely, the frame is mounted upside down on the top of the cell (2) in such a way that only the optical reflective component and a part of its adjustment units are inside the liquid. The front wall of the housing is provided with a window (501) to allow light beam to pass through. The height of the optical reflective component is selected in such a way that the center of optical reflective component is in line with the center of optical window (501). In one of the embodiments, the frame along with the stepper motor can form the top surface of the housing.

Both the optical cells (2/302 and 3/303) used in one embodiment for generation of variable delay between the two interfering beams have dimensions but not restricted to 400 mm×100 mm×180 mm (L×B×H) and are made of perspex material. The length of the water column in the cell can be changed from 50 mm to 350 mm. This allows the change in sensitivity range and time resolution of the velocity measurements. Optical windows (15, 16, 315, 316 & 501) are fitted on front side of the cells to provide optical access to incoming and reflected laser beams. The frame mounted on both the cells is coupled to stepper motors so that the flat mirrors (4 & 5) or cube corner prisms (304 & 305) can be moved accurately and precisely. This ensures that alignment of the interferometer is not disturbed during movement of flat mirrors/cube corner prisms. Slight misalignment, if any, can be corrected using piezoelectric based linear and tilt mechanisms provided for the flat mirrors.

Figure 6:
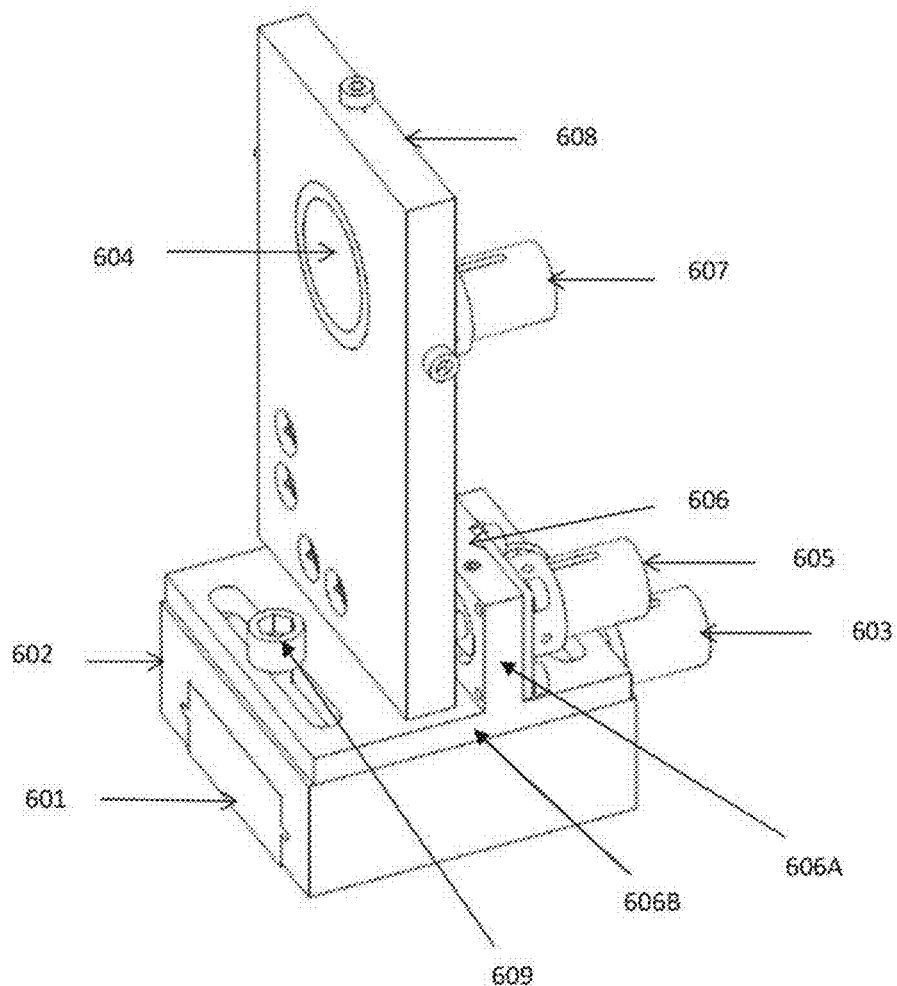
FIG. 6 illustrates auxiliary adjustment units of an optical cell in accordance with an embodiment of the present disclosure.

FIG. 6 depicts auxiliary adjustment units of one embodiment. The first auxiliary adjustment unit comprises a fixed member (601) attached to the base plate and a movable member (602) adapted to move with respect to the fixed member in the longitudinal direction independent of the movement of the base plate. Further, the second auxiliary adjustment unit (606) is fastened to the moveable member of the first adjustment unit. The second auxiliary adjustment unit comprises a horizontal structure (606B) and a vertical structure (606A) for supporting the vertical plate (608) and tilting the vertical plate along the horizontal and vertical direction with respect to the static support structure (606) independent of the movement of first auxiliary adjustment unit.

The first adjustment unit and the second adjustment unit provide a fine adjustment of the optical reflective component. The first adjustment unit is coupled to at least one piezoelectric actuator (603) for enabling fine linear movement of the movable member along the longitudinal direction. Similarly, the second adjustment unit is coupled to a piezoelectric actuator (605) for enabling tilting of the vertical plate along the horizontal direction and further coupled to another piezoelectric actuator (607) for enabling tilting of the vertical plate along the vertical direction.

Precisely, the first and second adjustment units are used for holding and maneuvering flat mirror (4) or cube corner prism (304) placed in the cell (2/302) of one embodiment. The second adjustment unit has piezo based tilt mechanism required for alignment of the interfering beams. Piezoelectric actuators (605 & 607) are used for providing tilt along horizontal and vertical directions to the vertical plate (608) against the static plate (606). The first adjustment unit (601, 602) has a provision for piezo based linear motion. Piezo based linear motion of the flat mirror/cube corner prism provides very fine adjustment which ensures that the apparent path lengths of the interfering beams in the two cells are exactly the same, a condition necessary for getting a single wide fringe or a bull's eye at the centre of fringe pattern. The first adjustment unit for the other flat mirror/cube corner prism for the other cell (3/303) is similar to the one described above except that the piezo based linear motion is for movement of cube corner prism transverse to the beam axis. This motion is used to ensure proper superposition of the interfering beams when reflective components are cube cornered prism.

The advantages of the disclosed inventive subject matter are thus attained in an economical, practical, and *facile* manner. While some aspects and example configurations have been shown and described, it is to be understood that various further modifications and additional configurations will be apparent to those skilled in the art. It is intended that the specific embodiments and configurations herein disclosed are illustrative of the preferred nature of the inventive subject matter, and should not be interpreted as limitations on the scope of the inventive subject matter.

What is claimed is:

1. A velocity interferometer system, comprising:
    a first optical cell including a first optical reflective component;
    a second optical cell including a second optical reflective component;
    a beam splitter configured to amplitude split an incident light beam, direct the split light beam into said first and second optical cells via a first and second path respectively, and recombine the reflected beams;
    at least one wave plate located between beam splitter and one of said first and second optical cells to facilitate generation of two fringe patterns having fringe shift of a quarter wave;
    at least one polarized beam splitter to separate out two fringe patterns having fringe shift of a quarter wave; and
    at least one pair of detectors for detecting the movement of interference fringes and recording phase quadrature signals;
    wherein, one of said first and second optical cells is partially filled with liquid such that the optical path length of the first and the second light beams is same, but their physical lengths are different; and
    wherein, each of said first and second optical cells comprises:
        a housing;
        a frame fitted upside down at a top surface of the housing comprising a pair of guide rails extending in a longitudinal direction;
        a base plate disposed on the frame and adapted to move on the guide rails in the longitudinal direction;
        a rotary shaft passing through the base plate for enabling linear movement of the base plate;
        a first auxiliary adjustment unit comprising a fixed member attached to the base plate and a movable member adapted to move with respect to the fixed member in the longitudinal direction independent of the movement of the base plate;
        a vertical plate having a slot to hold said optical reflective component; and
        a second auxiliary adjustment unit comprising a horizontal structure and a vertical structure for supporting the vertical plate and tilting the vertical plate along a horizontal and vertical direction with respect to a static support structure independent of the movement of the first auxiliary adjustment unit.

2. The velocity interferometer system of claim 1, wherein a front wall of the housing is provided with a window for allowing optical beam to pass through.

3. The velocity interferometer system of claim 1, further comprising:
    at least one piezoelectric actuator coupled to the first auxiliary adjustment unit for enabling linear movement of the movable member along the longitudinal direction.

4. The velocity interferometer system of claim 1, further comprising:
    at least one piezoelectric actuator coupled to the second auxiliary adjustment unit for enabling tilt movement of the vertical plate along the horizontal direction.

5. The velocity interferometer system of claim 1, further comprising:
    at least one piezoelectric actuator coupled to the second auxiliary adjustment unit for enabling tilt movement of the vertical plate along the vertical direction.

6. The velocity interferometer system of claim 1, wherein the rotary shaft is coupled to a stepper motor.

* * * * *